United States Patent [19]
Rainer

[11] Patent Number: 5,162,404
[45] Date of Patent: Nov. 10, 1992

[54] ION-ABSORBENT SPONGE PRODUCT

[76] Inventor: Norman B. Rainer, 2008 Fondulac Rd., Richmond, Va. 23229

[21] Appl. No.: 600,795

[22] Filed: Feb. 25, 1991

Related U.S. Application Data

[63] Continuation-in-part of Ser. No. 395,535, Aug. 18, 1989, Pat. No. 5,002,984.

[51] Int. Cl.$^5$ .................. C08G 11/00; C08G 69/26; C08J 5/20; B01D 15/00
[52] U.S. Cl. ........................................ 524/30; 524/35; 521/25; 521/30; 525/417; 210/688; 527/312; 528/341; 528/342
[58] Field of Search ............... 525/417; 521/25, 30; 524/30, 35; 210/688; 527/312; 528/341–42; 536/57

[56] References Cited

U.S. PATENT DOCUMENTS

| | | | |
|---|---|---|---|
| 3,715,339 | 2/1973 | Rainer | 525/417 |
| 4,332,916 | 6/1982 | Thill | 521/25 |
| 5,096,946 | 3/1992 | Rainer | 524/30 |

*Primary Examiner*—John Kight, III
*Assistant Examiner*—P. Hampton-Hightower
*Attorney, Agent, or Firm*—Norman B. Rainer

[57] ABSTRACT

A porous product for the removal of selected ions from water is made from an open-cell sponge of regenerated cellulose having uniformly distributed therein a high loading of insolubilized PEI. The insolubilized PEI does not significantly reduce the porosity of the sponge. The product has a pH in the range of 5.0 to 9.5, which thwarts microbial degradation of the moist product during storage in sealed containers.

9 Claims, No Drawings

ION-ABSORBENT SPONGE PRODUCT

RELATED APPLICATIONS

This application is a continuation-in-part of U.S. patent application Ser. No. 395,535, filed Aug. 18, 1989 now U.S. Pat. No. 5,002,984.

BACKGROUND OF THE INVENTION

1. Field of the Invention

This invention concerns a product for abstracting dissolved ions from aqueous solutions, and more particularly concerns an open-celled cellulosic sponge which non-occlusively holds an ion-selective polymer.

2. Description of the Prior Art

U.S. patent application Ser. No. 395,535 filed Aug. 18, 1989 now U.S. Pat. No. 5,002,984 discloses a sponge product for absorbing ionic species from aqueous solutions. The product is made from an open-celled sponge of regenerated cellulose which is caused to hold a large quantity of isolubilized polyethyleneimine (PEI) in a manner which does not significantly occlude the pores of the sponge. The insolubilized PEI, having selective ion absorption characteristics, has a water-swelling characteristic similar to that of the cellulose, thereby enabling it to remain attached to the water-swollen sponge.

However, if the sponge product is re-cycled between dry and wet states, the insolubilized PEI will gradually separate from the sponge. For this reason, it is best to maintain the sponge in water-swollen form. The wet or water-swollen form is in fact the initially produced form of the sponge product, the reason being that a water wash step is utilized to cleanse the sponge of any unreacted PEI and other interactive species.

In view of the use of certain polyfunctional carboxylic acids for achieving the insolubilization of the PEI, and some oxidation of cellulose which occurs during a thermal curing step which effects said insolubilization, the resultant sponge product is generally found to have a pH below 5.0.

When stored wet in sealed containers for prolonged periods of time, it has been found that the sponge product, at pH values below 5.0, undergoes microbial degradation. The degradation, which adversely affects the performance of the product becomes visible as regions of black, white, brown or green discoloration indicative of the effects of mold, mildew and fungus. Attempts to alleviate this problem with conventional anti-microbial agents have been tried unsuccessfully. One of the difficulties in overcoming this problem is that the product, usually in the form of cubes of about $\frac{1}{2}''$ size, has a high surface area for microbial attack, and the considerable space between adjacent sponges in bulk packaging permits facile cross-contamination of adjacent sponges.

It is accordingly an object of the present invention to provide a wet cellulosic sponge product containing insolubilized PEI and having resistance to microbial degradation.

It is another object of this invention to provide a sponge product of the aforesaid nature wherein said insolubilized PEI has water-swelling characteristics similar to that of cellulosic sponge.

It is a further object of the present invention to provide a sponge product of the aforesaid nature of relatively small size, and a commercial package comprising a multitude of said wet sponges confined within a sealed container.

These objects and other objects and advantages of the invention will be apparent from the following description.

SUMMARY OF THE INVENTION

The above and other beneficial objects and advantages are accomplished in accordance with the present invention by a shaped open-celled sponge product bounded by substantially flat surfaces and comprised of regenerated cellulose, insolubilized PEI attached to said cellulose, and sufficient water to cause said product to be soft and compressible, said insolubilized PEI having a water absorption capacity between about 100% and 300% and constituting between about 30% and 55% of the dry weight of the product, at least two of said flat surfaces being parallel, said product having a pH in the range of 5.0 to 9.5 and having a substantially uniform thickness, measured in at least one direction, of between 5 and 25 millimeters.

In preferred embodiments, the sponge product has a water content between 40% and 75%. The porosity of the sponge product is preferably reduced by no more than about 65% in comparison with the porosity of the starting cellulosic sponge from which the product is produced. The reason the sponge product can contain large quantities of insolubilized PEI without producing major occlusion of the pores of the sponge is that the insolubilized PEI is deposited as a coating upon the cell wall structure that defines the pores of the sponge.

DESCRIPTION OF THE PREFERRED EMBODIMENTS

The sponge starting material from which the product of the present invention is fabricated is an open-celled sponge whose cell wall material is comprised of regenerated cellulose. A typical suitable sponge is one having been manufactured by the heat treatment of a confined mixture of granular sodium sulfate decahydrate and green viscose. Such heat treatment coagulates and regenerates the cellulose while also melting away the sodium sulfate. One variety of suitable sponge is marketed by the Spontex Company of Columbia, Tenn.

The PEI employed in the production of the sponge product of this invention may have a molecular weight between about 1200 and 60,000, with a preferred range being between 1800 and 40,000. The PEI is a water-soluble, branched polymer comprising primary, secondary and tertiary amino nitrogens separated by ethylene groups of the formula —$CH_2$—$CH_2$—.

The insolubilization of the PEI is achieved by means of multi-functional cross-linking agents which interact with the amino nitrogen atoms. Preferred cross-linking agents are low molecular weight aliphatic polycarboxylic acids such as malonic, succinic and glutaric acids, iminodiacetic acid and nitrilotriacetic acid. Other cross-linking agents include low molecular weight aliphatic polyhalogenated compounds such as ethylene dichloride, ethylene dibromide and 1,3 dibromo propane. Still other types of cross-linking agents include halogenated carboxylic acids such as $\beta$ bromopropionic acid.

To achieve the insolubilization of the PEI in situ, namely within the cellulosic sponge, a homogeneous aqueous precursor solution is initially formed which contains the PEI and cross-linking agent. The precursor solution is then impregnated into the cellulosic sponge. The solids content of the precursor solution is preferably in the range of 20% to 45%. Solutions more concentrated than 45% become viscous and do not adequately penetrate the cellulose sponge. The sponge is preferably saturated with the precursor solution and then squeezed to remove excess solution. The thus treated sponge will typically contain an amount of solution between 90% and 200% of the starting dry weight.

The cellulosic sponge impregnated with the precursor solution is heated to evaporate off water, and is subsequently heated at a curing temperature in the range of 130 degrees C. to 165 degrees C. for 20 to 80 minutes to effect insolubilization of the PEI. The sponge product is then washed with water, which swells the sponge and removes traces of unreacted PEI and cross-linking agent. The final product should contain between 25% and 50% insolubilized PEI (dry weight basis) in order to be of practical value in water treatment operations. The actual amount of insolubilized PEI in the sponge can be ascertained either by weight considerations during manufacture, or by determination of the nitrogen content of the sponge product.

The extent to which the PEI becomes cross-linked is dependent upon the ratio of cross-linking agent to PEI and the duration and severity of thermal curing. It has been found that, only within a narrow range of cross-linking, will the insolubilized PEI become durably attached to the cellulose. The degree of cross-linking or insolubilization of the PEI is best characterized by its ability to absorb water. Insolubilized PEI having the proper degree of cross-linking to be effective in the product of the present invention will absorb water to the extent of between 100% and 300% of its dry weight.

The water absorption characteristic of the insolubilized PEI is best measured by creating the insolubilized PEI separately from the sponge, and measuring its water-absorption propensity. Accordingly, a quantity of the precursor solution may be placed in a beaker as a thin layer and heated under the same conditions of time, temperature and air circulation as employed to make the sponge product. In such manner, the insolubilized PEI polymer is obtained as a clear, bubbled amber-colored brittle substance. When water is added, the bubbled shape disintegrates by decrepitation to form water-swollen granules. A quantity of the water-swollen granules is placed on a blotter to remove excess water. A weighted quantity of the blotted granules is then dried at 95 degrees C. until a constant weight is achieved, thereby determining the water contained in the water-swollen granules. Those polymers produced by the aforesaid method having a water absorption value below 100% are too highly cross-linked to remain attached to the cellulose when the sponge is immersed in water. Those polymers having a water absorption value over 300% lack adequate cohesive strength to be durably retained by the cellulose.

The dimensions of the sponge product have been found to be of critical significance. One reason for the dimensional criticality is that the thermal treatment required to insolubilize the PEI is also likely to cause thermal and oxidative degradation of the polymer and cellulose, particularly in the peripheral regions of the sponge. When curing conditions are chosen to minimize such degradation, it has been found that interior regions are inadequately cured.

The preferred configuration of the sponge is a cuboid one bounded by six substantially flat surfaces. Two of said surfaces represent a primary pair of parallel surfaces spaced apart by a distance representing an X axis having a length between 5 and 25 millimeters. The other four surfaces extend between said primary surfaces to define a sidewall perimeter causing the sponge to have at least one plane of symmetry perpendicular to said primary surfaces and including the X axis. The shortest straight line distance spanning said perimeter while perpendicularly intersecting said X axis is considered to be a Y axis. The longest straight line distance spanning said perimeter while perpendicularly intersecting said X axis is considered to be a Z axis. The sum of the X and Y axes should preferably be in the range of 10–60 mm, and the Z axis is preferably less than six times the X axis. Sponges having the aforesaid critically defined geometry can be made to contain high levels of insolubilized PEI uniformly distributed throughout the sponge.

The severity of microbial attack upon the wet sponge can be determined either by counting the number of visible spots of attack following a period of controlled storage, or by measuring the loss of ion absorption capability. Alternatively, loss of tensile strength can be measured on a long strip of sponge product which otherwise has all the properties of the sponge product of this invention.

The porosity of a sponge is generally characterized in the sponge-manufacturing industry by the controlled measurement of resistance to air flow through the sponge. In said test method, as employed on the sponge product of this invention, measurement is made of the pressure required (inches of water) to force 4 cubic ft./min. of air through a sponge 30 mm thick pressed between two plates which present a circular opening of 70 mm diameter. It has been found that, although the porosity of the polymer-laden sponges of this invention diminishes with increasing polymer content, the impedance to diffusion of aqueous liquids through the sponge is not significantly impaired until the air flow is reduced more than 65% compared to the untreated sponge.

The absorption capacity of the sponge product of this invention for metal ions is dependent upon the nature of the ion, the pH of the solution being treated, and the nature and concentration of species capable of forming coordination complexes, typical such species being $CN^-$, phosphates, and ethylenediamine. However, even under adverse conditions, the product will generally absorb at least 2% by weight of most transition metal ions. In the case of ions such as $Cu^{++}$ and $Cd^{++}$, for example, the weight of absorbed ions at saturation may range to about 15%. In its preferred mode of utilization, the sponge product is disposed in a column through which water is passed for treatment. Alternatively, the sponge product may be confined within elongated fishnet type enclosures which are immersed in the water to be treated.

A further understanding of my invention will be had from a consideration of the following examples which illustrate certain preferred embodiments. All parts and percentages are by weight unless otherwise indicated. It is understood that the instant invention is not to be construed as being limited by said examples or by the details therein.

EXAMPLE 1

One hundred and twenty parts of nitrilotriacetic acid (NTA) were mixed with 140 parts PEI of molecular weight 10,000, and 500 parts of water at 40 degrees C., to form a precursor solution having a solids content of 34.2%. Pieces of opencelled sponge of regenerated cellulose in the form of cubes measuring 9 mm per side were impregnated with the precursor solution and then squeezed between rollers to produce damp sponges having about 170% add-on of precursor solution. The sponges were dried at 120 degrees C. until dry, then cured at 160 degrees C., for 55 minutes, and wased with water. The resultant sponge product was found, by Kjeldahl analysis, to be comprised of 33% (dry weight basis) of insolubilized PEI.

Some of the precursor solution was alternatively placed in a petri dish and dried and cured under the same conditions employed for the sponge product. The resultant insolubilized PEI was washed with water, which caused self-granulation. The resultant granules were found to have a water absorption capacity of 156%.

The sponge product, prepared as above-described, was soaked, as separate samples of 50 cubes each, in different aqueous solutions having pH values in the range of 3.2–11.4. Following soaking, the sponges were washed with distilled water. However, when re-immersed in distilled water, the water generally acquires a pH value corresponding to the pH of the original soak solution. The pH adjustments of the soak solutions were made using either HCl or NaOH.

The separate pH-adjusted samples were then blotted dry and tested for resistance to microbial degradation in the following manner: Each sample is shaken in a 3 mil polyethylene bag with 200 grams of potting soil to ensure uniform coating of the sponge cubes. The potting soil is comprised of one part loam, one part peat moss, one part sand, and 1% soluble fertilizer. The bag is sealed and stored at 36 degrees centigrade for 14 days. The sponges are then rinsed with distilled water, then immersed in a $CuSO_4$ solution at pH 5.8 until saturation with absorbed $Cu^{++}$ is achieved. The copper-saturated sponges are then washed, dried and analyzed for copper content by digestion in aqua regia followed by atomic absorption analysis of the digestion solution. The following data was obtained:

TABLE 1

| pH of Sponge (prior to storage) | % Copper Absorption (dry weight basis) |
| --- | --- |
| 3.2 | 0.5 |
| 4.4 | 0.8 |
| 5.1 | 2.2 |
| 6.3 | 3.1 |
| 7.4 | 3.9 |
| 9.1 | 3.3 |
| 10.3 | 2.4 |
| 11.2 | 1.9 |

The data of Table 1 indicate that, at pH values below about 5.1 microbial degradation causes loss of ion absorption capacity of the sponge product. This is confirmed by actual production results wherein it has been found that the wet sponge product of this invention, at pH levels below about 5.0, develops fungal discolorations and loses its ion absorption capability. In the course of manufacture of the sponge product employing the NTA of this example as a cross-linking agent for the PEI, it has been found that, at ratios of NTA/PEI above about 1.2, the resultant washed sponge product will inherently have a pH below about 5.0. Such product must be treated with a base to elevate its pH. Otherwise, the product deteriorates when stored in sealed containers.

EXAMPLE 2

The precursor solution of Example 1 was employed to treat pieces of cellulosic sponge cut from a large sheet having a uniform thickness of 10 mm (representing an X axis). The pieces are rectangular, having a width of 50 mm (representing a Y axis) and a length of 75 mm (the diagonal of which represents a Z axis). The impregnated pieces of sponge were then squeezed between rollers to produce damp sponges having about 183% add-on of precursor solution. The sponges were then dried, cured and washed as described in Example 1.

The sponges were then separated into pairs. Both sponges of each pair were soaked in pH adjusted solutions to achieve equilibrium with the solution. The sponges were then blotted dry. One member of each pair was set aside for immediate tensile test measurement. The other member of the pair was subjected to microbial degradation as in Example 1, and was then tested for tensile strength. In each pair, the comparison of tensile measurements gives a percent loss of tensile strength due to microbial degradation.

Tensile testing was done using a Scott Tensile Tester with rough faced jaws, three inches in width and set one inch apart. The sponges are firmly clamped in the jaws across the length dimension to secure a first tensile break, and are then clamped across the width direction to secure the second tensile break. The two tensile breaking values are then added. Typical tensile values by such test method conducted on the untreated starting sponge of this Example in wet form are in the range of about 60–75 psi. The test data obtained are reported in Table 2.

TABLE 2

| pH of Sponge (prior to storage) | % Loss of Tensile Strength |
| --- | --- |
| 4.6 | 34 |
| 5.8 | 33 |
| 6.4 | 38 |
| 7.7 | 36 |
| 8.5 | 39 |
| 9.4 | 37 |
| 10.3 | 65 |
| 11.1 | 72 |
| 11.9 | 69 |

As the data of Table 2 indicate, there is a sudden increase in loss of strength at pH values above about 9.4. The loss in tensile strength may be attributed to degradation of the cellulose, because the insolubilized PEI is not considered to impart tensile strength to the sponge product. The loss in tensile strength further correlates with the observation that sponge products of high pH stored for prolonged periods of time in stored containers develop discoloration and loss of shape under the mild compressive force exerted by overlying sponges. The sponge product would inherently have a pH above 9.5 if the ratio of NTA/PEI employed in precursor solution is below 0.5.

Wherever pH values of sponge products are specified in this application, it is intended that such values are determined by immersing a sponge in the minimum amount of water to ensure complete coverage of the sponge, and the sponge is allowed sufficient time to equilibrate with the water. The pH of the water is then measured with conventional pH-measuring devices.

The results of Examples 1 and 2, and experience acquired in the manufacture and distribution of the sponge product of this invention clearly indicate that the sponge product should have a pH within the range of 5.0 to 9.5 to avoid microbial degradation in wet form in sealed containers. Although anti-microbial agents such as benzalkonium chloride and pentachlorphenol have some effectiveness in preventing microbial degradation, the pH effect far outweighs the effects of such agents.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A shaped open celled sponge product bounded by substantially flat surfaces and comprised of regenerated cellulose, insolubilized polyethyleneimine attached to said cellulose, and sufficient water to cause the product to be soft and compressible, said insolubilized PEI constituting between 25% and 50% of the dry weight of the product, at least two of said flat surfaces being parallel, said sponge product having a pH in the range of 6.3 to 9.5 and having a substantially uniform thickness, measured in at least one direction, of between 5 and 25 millimeters.

2. The sponge product of claim 1 having a water content between 40% and 75%.

3. The sponge product of claim 1 whose porosity is reduced no greater than 65% by virtue of the presence of said insolubilized PEI.

4. The sponge product of claim 1 wherein said insolubilized PEI has a water absorption capacity between about 100% and 300%.

5. The sponge product of claim 1 wherein said insolubilized PEI has been produced by the thermal interaction of a polyfunctional cross linking agent with a water soluble PEI.

6. The sponge product of claim 1 bounded by six substantially flat surfaces.

7. The sponge product of claim 6 having a substantially cubical shape.

8. The sponge product of claim 1 produced by impregnating an open-celled sponge of regenerated cellulose with an aqueous precursor solution containing PEI and a cross-linking agent, evaporating off water, and heating in the range of 130 degrees C. to 165 degrees C. to achieve insolubilization of the PEI as a coating upon the cellulose.

9. A sealed container confining a multitude of the sponge product of claim 1.

* * * * *